United States Patent [19]

Frasca

[11] Patent Number: 4,828,441
[45] Date of Patent: May 9, 1989

[54] LOCKED THREADED INSERT FOR HIGH STRESS APPLICATION

[75] Inventor: Thomas Frasca, Wethersfield, Conn.

[73] Assignee: United Technologies Corporation, Hartford, Conn.

[21] Appl. No.: 70,852

[22] Filed: Jul. 8, 1987

[51] Int. Cl.⁴ .............................................. F16B 37/04
[52] U.S. Cl. ................................... 411/183; 411/177; 411/427; 411/972; 403/406.1
[58] Field of Search .............. 411/183, 177, 271, 427, 411/501, 972; 403/22, 406.1, 407.1

[56] References Cited

U.S. PATENT DOCUMENTS

| | | | |
|---|---|---|---|
| 2,359,031 | 9/1944 | Goshia | 248/309 |
| 2,577,810 | 12/1951 | Rosan | 411/972 X |
| 3,247,878 | 4/1966 | Rosan et al. | 151/41.73 |
| 3,280,874 | 10/1966 | Rosan | 151/41.72 |
| 3,371,402 | 3/1968 | Neuschotz | 29/243.52 |

FOREIGN PATENT DOCUMENTS

| | | | |
|---|---|---|---|
| 26141 | 4/1981 | European Pat. Off. | 411/183 |
| 44700 | 10/1988 | Fed. Rep. of Germany | 411/177 |
| 1134769 | 12/1956 | France | 411/177 |
| 819406 | 9/1959 | United Kingdom | 411/177 |

*Primary Examiner*—Gary L. Smith
*Assistant Examiner*—Curtis B. Brueske
*Attorney, Agent, or Firm*—Edward L. Kochey, Jr.

[57] ABSTRACT

A threaded insert 22 is restrained from rotation by deformation into a recess 28. The recess 28 is only located in line with a directional stress pattern 34 in the receiving member 18 whereby stress concentration is avoided at high stress locations.

5 Claims, 2 Drawing Sheets

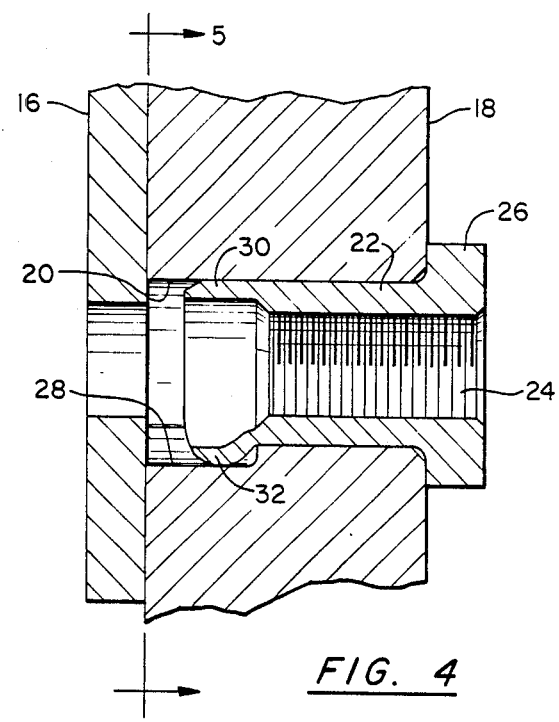
FIG. 4
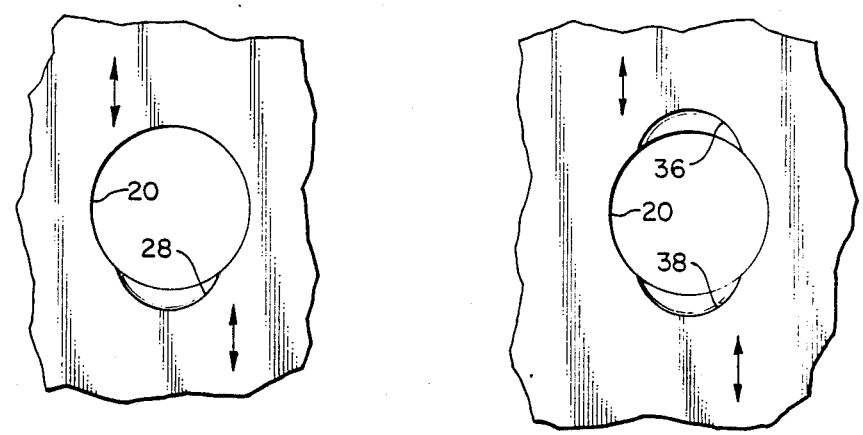
FIG. 5
FIG. 6

LOCKED THREADED INSERT FOR HIGH STRESS APPLICATION

TECHNICAL FIELD

The invention relates to threaded inserts for plates and in particular for inserts placed within plates having a high directional stress.

There are occasions when attachments must be bolted to plates with the plates having high stresses therein. The threads of a tapped hole create high stress concentrations and accordingly are unacceptable in such an environment. It therefore is known to provide unthreaded openings through the plate and to place threaded inserts therein. While the opening through the plate is larger, the absence of stress concentrations because of threads actually results in a lower stress level. Prior art inserts while not creating the stress concentrations of a threaded opening have produced stress concentrations because of the locking mechanisms used to prevent the insert from rotating when the accessory is bolted thereto.

DISCLOSURE OF THE INVENTION

There is provided a threaded insert arrangement for securing a threaded insert to a plate with that plate having a high directional stress therein. The insert is for later bolting an attachment thereto. A cylindrical opening through the plate receives an insert having a tightly fitting cylindrical body and an internal longitudinally threaded bore. A shoulder on the insert abuts against the inside of the plate which may later be inaccessible when attaching the accessory.

Contiguous with the cylindrical opening and the plate is a restraining recess preferably in the form of a part depth partially cylindrical recess. This recess is located only in line with the directional stress so that it is located at a very low stress region with respect to the stress pattern around the cylindrical opening. A portion of the insert is located so as to be deformable into the restraining recess.

BRIEF DESCRIPTION OF THE DRAWINGS

FIG. 4 is a section through the threaded insert.

FIG. 5 is a view of the recess.

FIG. 6 is an alternate view using two recesses.

DESCRIPTION OF THE PREFERRED EMBODIMENT

Figure 1:
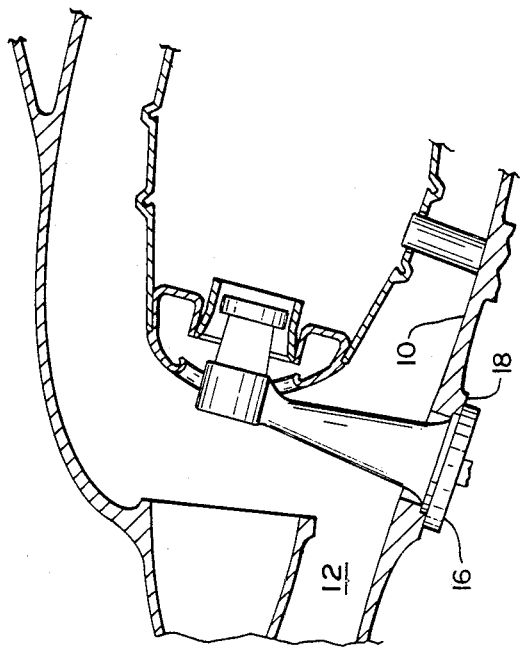
FIG. 1. shows a fuel nozzle mounted in a highly stressed plate.
Figure 2:
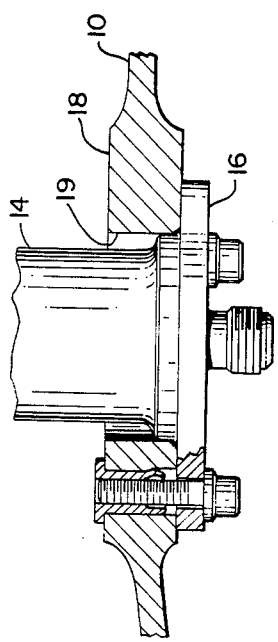
FIG. 2 is a detail of the mounting of the fuel nozzle.

FIG. 1 illustrates the combustor area of a gas turbine engine wherein combustor shell 10 contains high temperature high pressure air 12 in the order of 450 psi pressure and 1000° F. temperature. A fuel injector 14 secured to flange 16 must be bolted into place during construction. For this purpose the combustion shell 10 has a thickened portion 18 with openings therein for the purpose of bolting flange 16 thereto.

Because of the high internal pressure the combustor shell 10 including the thickened portion 18 is highly stressed in the hoop stress direction while stresses are much lower in the other direction. This is particularly so since it is desirable to keep this shell as thin as possible not only to save weight but to avoid stresses caused by thermal transients.

The shell must have a large opening 19 for receiving the fuel injector in addition to whatever openings are required for bolting purposes. The opening 19 through the shell is unavoidable and causes a stress pattern flow around the opening which creates stresses higher than those already existing. While thickening of the material locally provides some relief, it is still of critical importance to avoid any unnecessary stress concentrations which could start local cracking which would propagate to ultimate failure. Threading the openings through the shell would create such unacceptable stress concentrations.

A cylindrical opening 20 is placed through plate 18 at each location where a bolted connection is desired. An insert 22 having a cylindrical body is placed within opening 20 and formed to have a tight fit. Such tight fit is an interference fit of 0.0005 to 0.00035 inches. The insert has a threaded bore 24 longitudinally extending through the insert. It has a shoulder 26 extending beyond the cylindrical body for abutment with plate 18 to secure the insert in that direction not only prior to bolting on the fuel injector but in resisting the force created by the bolting.

As best seen at FIG. 5 the cylindrical opening 20 has contiguous therewith a partial cylindrical recess 28 centered about a line which intersects the central axis parallel to the directional stress. An unthreaded cylindrical extension 30 is located adjacent to the recess and a portion 32 is deformed into the recess. The insert is thereby retained from falling out and also capable of resisting rotation when an attachment is bolted thereto.

Figure 3:
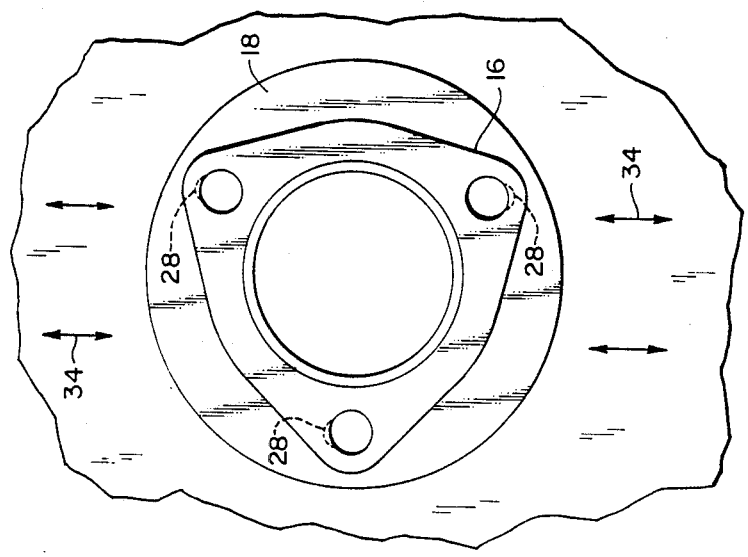
FIG. 3 is a detail from the bolted side of the connection showing the orientation of the restraining recesses with respect to the stress field.

FIG. 3 shows the direction of the high hoop stress 34. It is essential that these recesses 28 be in line with the stress path as illustrated by the three openings in FIG. 3. A high stress occurs at the portion of the material adjacent to the openings where the side of the opening is parallel to the stress field. Low stresses exist at the points 90 degrees therefrom. Accordingly, the recess for holding the insert and preventing rotation is placed only at these low stress conditions. Accordingly, an insert is provided which may be held and restrained with a minimum of stress concentrations.

FIG. 6 shows an alternate embodiment having two recesses 36 and 38 which are located 180 degrees apart. Both of these recesses are, however, only in line with the known high directional stress.

I claim:

1. A threaded insert arrangement for securing a threaded insert to a plate having a high directional stress therein, for later holding at attachment thereto comprising:

a plate having a directional stress therein parallel to the surface of said plate;

a cylindrical opening through said plate;

an insert having a cylindrical body, an internal longitudinally extending threaded bore, and a shoulder extending radially beyond said cylindrical body for abutment with said plate;

a restraining recess in said plate contiguous with said cylindrical opening and centered about a line which intersects the central axis parallel to said directional stress; and a portion of said insert located so as to be deformable into said restraining recess.

2. A threaded insert arrangement as in claim 1:

said restraining recess comprising a recess only partly through the thickness of said plate, and having an edge in the form of a partial cylinder.

3. A threaded insert arrangement as in claim 1:

said insert having an unthreaded extension extending beyond said threads at the end opposite said shoulder;

said extension located adjacent said retaining recess when said insert is placed within said cylindrical opening; and at least a portion of said extension deformed into said recess.

4. A threaded insert arrangement as in claim 3:

said unthreaded extension comprising a cylindrical extension.

5. A threaded insert arrangement as in claim 1:

a second restraining recess contiguous with said cylindrical opening located 180 degrees from the other restraining recess, whereby both recesses are and centered about a line which intersects the central axis parallel to said directional stress.

* * * * *